US012406375B2

(12) United States Patent
Rock et al.

(10) Patent No.: US 12,406,375 B2
(45) Date of Patent: Sep. 2, 2025

(54) POSE DETECTION OF AN OBJECT IN A VIDEO FRAME

(71) Applicant: The Boeing Company, Chicago, IL (US)

(72) Inventors: Jason J. Rock, Tukwila, WA (US); Jacob A. Lucas, Kihei, HI (US); Trent M. Kyono, Kihei, HI (US); Justin C. Hatcher, Tukwila, WA (US)

(73) Assignee: The Boeing Company, Arlington, VA (US)

( * ) Notice: Subject to any disclaimer, the term of this patent is extended or adjusted under 35 U.S.C. 154(b) by 407 days.

(21) Appl. No.: 17/849,591

(22) Filed: Jun. 24, 2022

(65) Prior Publication Data

US 2023/0026394 A1 Jan. 26, 2023

Related U.S. Application Data

(60) Provisional application No. 63/225,935, filed on Jul. 26, 2021.

(51) Int. Cl.
*G06T 7/11* (2017.01)
*G06T 7/73* (2017.01)
*G06V 20/17* (2022.01)

(52) U.S. Cl.
CPC .................. *G06T 7/11* (2017.01); *G06T 7/75* (2017.01); *G06V 20/17* (2022.01); *G06T 2207/10016* (2013.01); *G06T 2207/10032* (2013.01)

(58) Field of Classification Search
CPC ... G06T 7/11; G06T 7/75; G06T 2207/10016; G06T 2207/10032; G06T 2207/20081; G06T 2207/20084; G06T 2207/30212; G06T 2207/30248; G06V 20/17; G06V 20/647; B64D 47/08; B64D 39/00
USPC .......................................................... 382/103
See application file for complete search history.

(56) References Cited

U.S. PATENT DOCUMENTS

| | | | |
|---|---|---|---|
| 9,150,310 B1* | 10/2015 | Bray | B64D 39/00 |
| 11,354,860 B1* | 6/2022 | Deng | G06T 19/20 |
| 2019/0325644 A1* | 10/2019 | Bleyer | G06T 17/20 |
| 2019/0344902 A1* | 11/2019 | Cramblitt | B64C 19/00 |
| 2021/0039804 A1* | 2/2021 | Ropers | B64D 39/06 |
| 2022/0309708 A1* | 9/2022 | Bhate | G06T 7/20 |
| 2022/0327718 A1* | 10/2022 | Dutta Choudhury | H04N 23/951 |
| 2023/0016464 A1* | 1/2023 | OConnor | G06N 20/00 |

* cited by examiner

*Primary Examiner* — Tom Y Lu
*Assistant Examiner* — Pardis Sohraby
(74) *Attorney, Agent, or Firm* — Harrity & Harrity, LLP

(57) ABSTRACT

Aspects of the disclosure provide solutions for determining a position of an object in a video frame. Examples include: receiving a segmentation mask of an identified object in a video frame; adjusting a 3D representation of a moveable part of the object based on constraints for the moveable part; comparing the 3D model of the object to the segmentation mask of the object; determining a match between the 3D model of the object to the segmentation mask of the object is above a threshold; and based on the match being above the threshold, determining a position of the object.

20 Claims, 8 Drawing Sheets

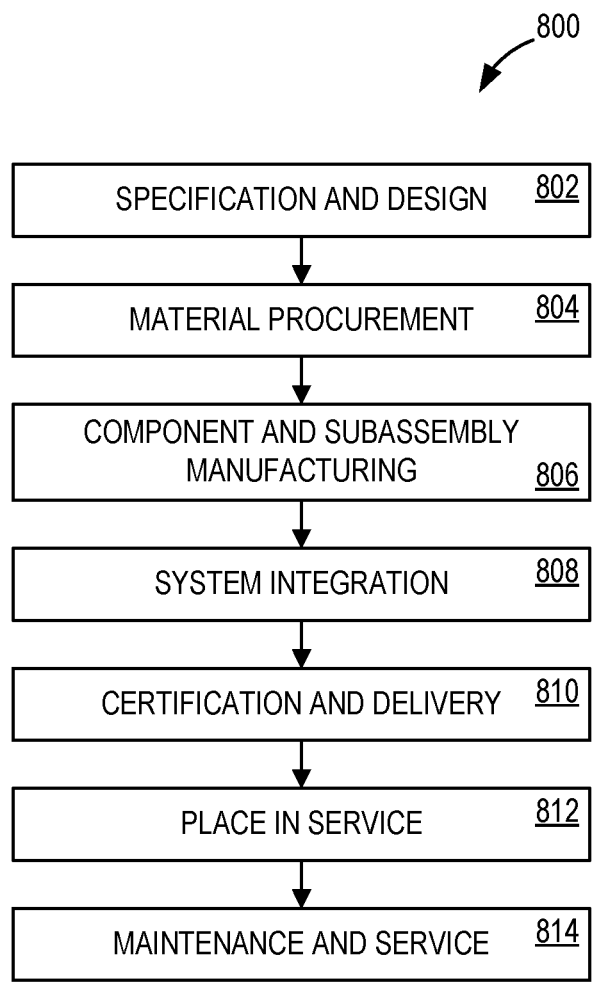

POSE DETECTION OF AN OBJECT IN A VIDEO FRAME

CROSS-REFERENCE TO RELATED APPLICATION

This application claims priority to U.S. Provisional Patent Application No. 63/225,935, entitled "POSE DETECTION OF AN OBJECT IN A VIDEO FRAME," filed on Jul. 26, 2021, the disclosure of which is incorporated herein by reference in its entirety.

BACKGROUND

Aerial refueling (air-to-air refueling) is typically performed manually, by a highly-skilled aerial refueling operator. Some arrangements place the human operator behind a window, with a view of the refueling boom and the aircraft to be refueled. This type of arrangement requires the added significant expense of providing accommodation for the human operator in the rear of the refueling platform.

Some arrangements use computer vision techniques to aid the aerial refueling operator in performing the task of mating a receiver on the aircraft to be refueled with the refueling boom. These arrangements use stereoscopic vision with dual cameras, in which the aerial refueling operator wears goggles that provide a three-dimensional (3D) view based on the views from the dual cameras. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Aspects of the disclosure provide solutions for determining a pose of an object in a video frame. Examples include: receiving the video frame; identifying the object from the video frame, the object comprising a rigid part and a moveable part; generating a segmentation mask of the identified object within the video frame; accessing a three-dimensional (3D) model of the object, the 3D model comprising: a 3D representation of the rigid part, a 3D representation of the moveable part, and constraints corresponding to the moveable part of the object; making a first comparison of the 3D model of the object to the segmentation mask of the object; based on the first comparison, determining a match between the 3D model of the object to the segmentation mask of the object is below a threshold; based on determining the match between the 3D model of the object to the segmentation mask of the object is below the threshold, adjusting at least one of the 3D representation of the rigid part and the 3D representation of the moveable part using the constraints; making a second comparison of the 3D model of the object to the segmentation mask of the object; based on the second comparison, determining the match between the 3D model of the object to the segmentation mask of the object is above the threshold; and based on determining the match is above the threshold, determining the pose of the object.

BRIEF DESCRIPTION OF THE DRAWINGS

The disclosed examples are described in detail below with reference to the accompanying drawing figures listed below:

FIG. 8 is a block diagram of an apparatus production and service method 800 that employs various aspects of the disclosure in accordance with an example.

Corresponding reference characters indicate corresponding parts throughout the drawings in accordance with an example.

DETAILED DESCRIPTION

Figure 1:
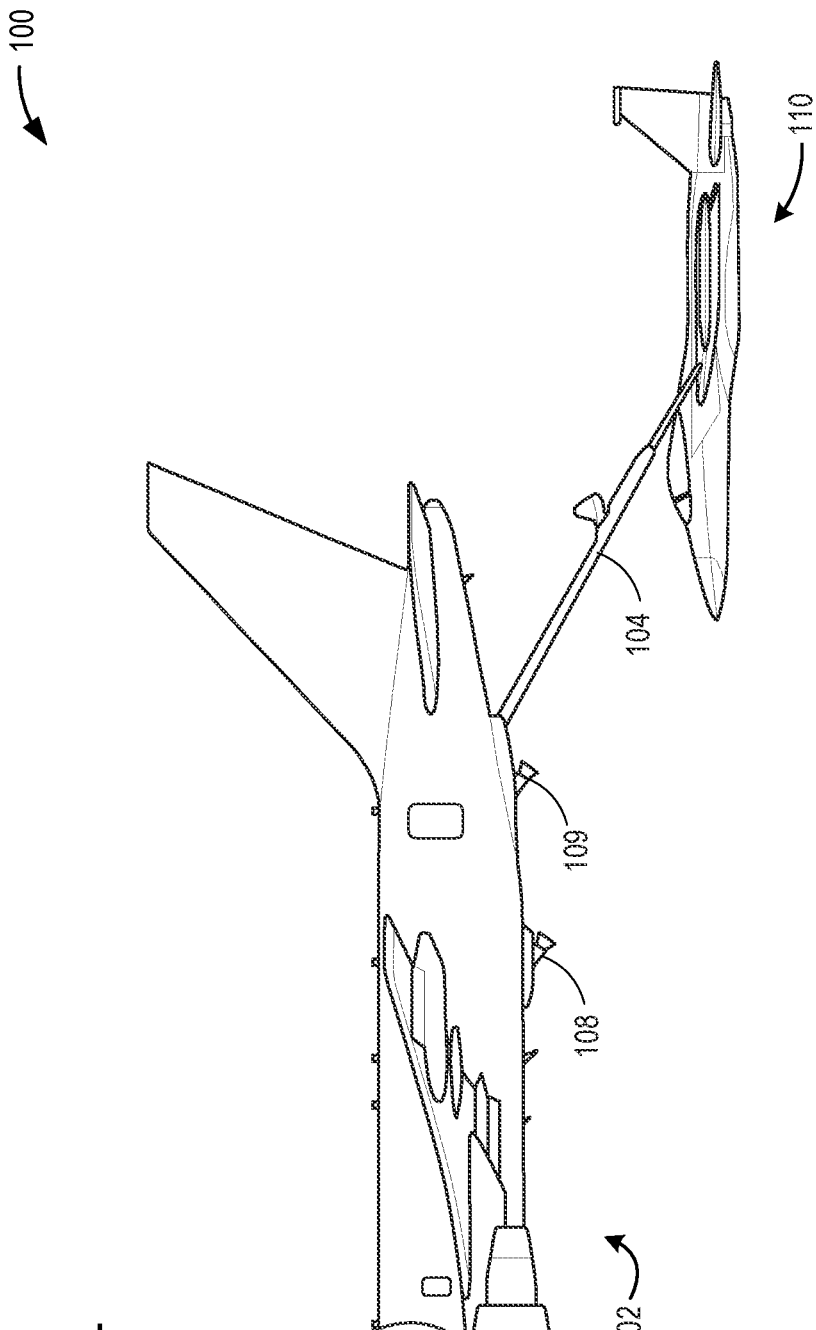
FIG. 1 illustrates an arrangement that advantageously employs segmentation-based fuel receptacle localization for automated air-to-air refueling (A3R) and assisted air-to-air refueling, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects of the disclosure provide solutions for automated air-to-air refueling (A3R) and assisted air-to-air refueling. While examples described herein are directed to estimating a pose of an aerial refueling boom for A3R and assisted air-to-air refueling, aspects of the disclosure are able to estimate a pose of any three-dimensional object in a video stream collected by a single camera.

Aspects of the disclosure have a technical effect of improved operation of a computer, for example by reducing distance calculations, improving the efficiency of computational hardware, and provide better allocation of resources, as compared to traditional systems that rely on, for example processing many different measurement inputs. For example, aspects herein improve the operation of a computer by reducing the computation time (e.g., speed improvement). For example, a machine learning approach offloads pattern recognition tasks to a graphics processing unit (GPU), instead of a central processing unit (CPU). Further, the use of a single camera can reduce component failures and be more easily integrated into existing systems. In addition, by utilizing constraints for moveable parts in a three-dimensional (3D) model, the computations and computation time calculating various poses of the 3D model are reduced.

Aspects of the disclosure are able to estimate the pose of a 3D object (e.g., an aerial refueling boom) in a video stream collected by a single camera, such as in support of autonomous aerial refueling operations and/or human-assisted aerial refueling operations. For example, aspects of the disclosure identify an aerial refueling boom in a video frame and generate a segmentation mask, for example, a semantic segmentation mask of the aerial refueling boom, compare the segmentation mask to a 3D model of the 3D object, and based on the comparing, determine a pose of the 3D object. Semantic segmentation refers to the process of linking each pixel in an image (e.g., the video frame) with a class label, such as an aircraft, an aerial refueling boom, or background. Some examples use a convolutional neural network (CNN), such as a residual neural network (ResNet) to generate the segmentation mask.

The 3D model of the object is generated based on an estimated position and orientation (e.g., pose) of the object as viewed by a single camera. A position and/or pose estimation may be accomplished using machine learning (ML), such as with a neural network (NN), a U-Net CNN, or with a perspective n-point (PnP) algorithm. For example, a fully convolutional NN (FCNN) may be trained to map an image of an object of interest (e.g., fuel receptacle or refueling boom) to a binary mask. When the 3D model of the object is produced by the estimated position and/or orientation matches (e.g., within a threshold level) the segmentation mask, the estimated position and/or pose of the object may be taken as the position and/or pose of the object. The segmentation mask provides a continuous surface for gradient descent to fit, and additionally offers flexibility for handling various configurations of aircraft seeking refueling.

Some examples further use temporal filtering, such as a Kalman filter, or an ML model, to temporally filter and stabilize position data, to improve localization accuracy. Some examples incorporate available auxiliary sensor data such as light detection and ranging (lidar), radar, or another type of proximity sensor. Some examples may be able to process twenty frames per second (20 fps), or more, with available computational hardware.

Referring more particularly to the drawings, FIG. 1 illustrates an arrangement 100 that includes a refueling platform 102 and an aircraft 110 to be refueled. In the arrangement 100, the refueling platform 102 uses an aerial refueling boom 104 to refuel the aircraft 110. In certain examples, one or more of the platform 102 or the aircraft 110 may be manned or unmanned. A camera 108 provides a video stream 202a (shown in FIG. 3) for use in determining a position and/or pose of the aerial refueling boom 104 in relation to the camera 108 and/or the aircraft 110. For some examples of the arrangement 100, a computer vision (CV) architecture 300 (shown in FIG. 3) enables proximity sensor measurements 432 (shown in FIG. 4) from a proximity sensor (109) on the refueling platform 102 with position information of the aircraft 110 to determine a position of the fuel receptacle 116 on the aircraft 110. In some example, the aircraft 110 position and fuel receptacle 116 position (a position and pose of a fuel receptacle on the aircraft) is provided in, for example, 6DoF. The fuel receptacle 116 position and a position/pose of the aerial refueling boom 104, and more specifically a position of boom tip 106, are provided determine a distance between the boom tip 106 and the fuel receptacle 116, which are both shown in FIG. 2. A position and pose of the aircraft 110 is determined and, from that, the position of the fuel receptacle 116. That is, once the aircraft 110 position is known, the position of the fuel receptacle 116, which is in a predetermined location on the aircraft 110, can be determined. In some examples, the position of the aircraft 110 and/or the position of the fuel receptacle 116 is filtered with a filter, such as a Kalman filter (which filters in time across video frames).

Figure 2:
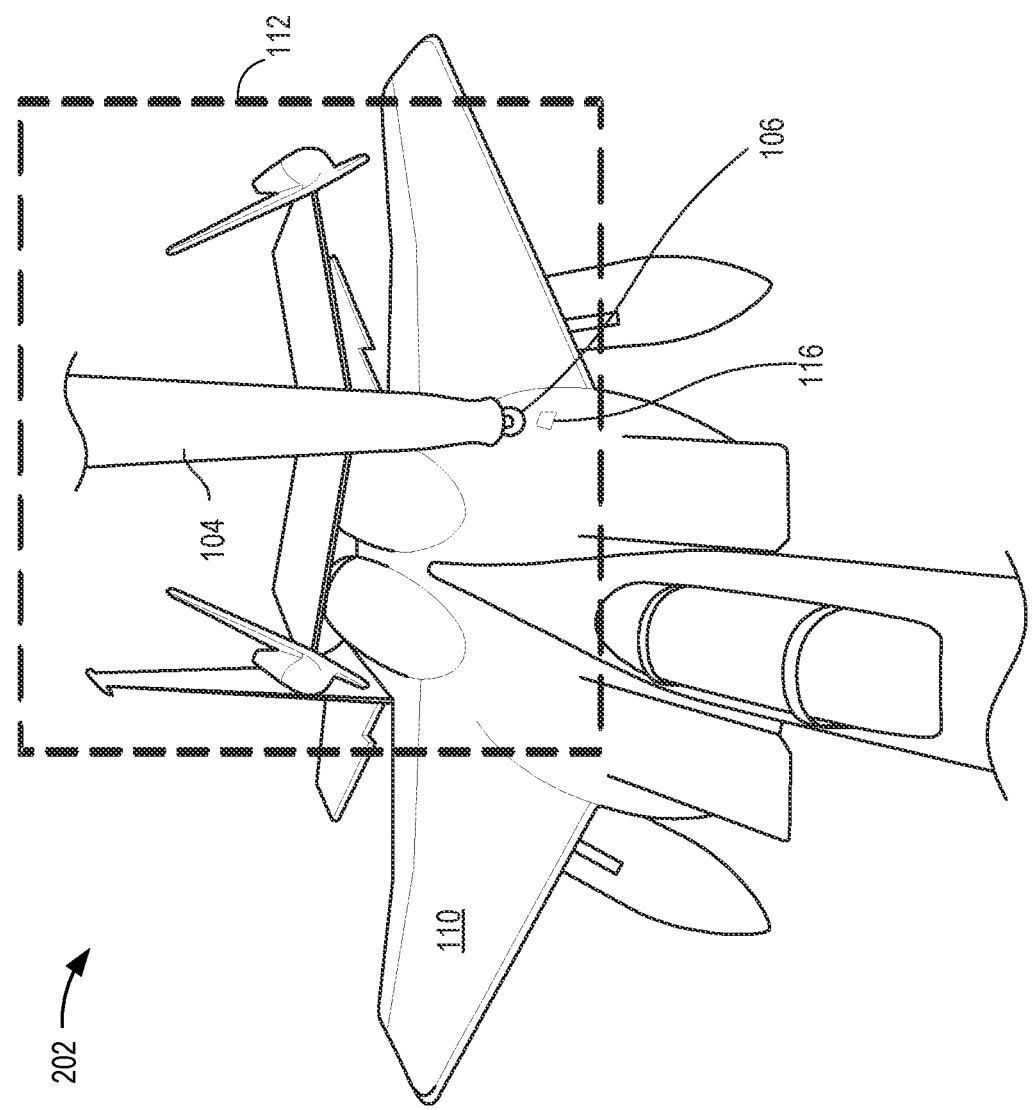
FIG. 2 illustrates a video frame from a camera in the arrangement, in accordance with an example.

FIG. 2 illustrates a video frame 202, which is a frame from the video stream 202a (shown in FIG. 3), captured by the camera 108. A bounding box 112 identifies the aerial refueling boom 104 (e.g., the object). In operation, the aerial refueling boom 104 delivers fuel to the aircraft 110 by the boom tip 106 engaging the fuel receptacle 116. The bounding box 112 around the aerial refueling boom 104 may be used for cropping the video frame 202 in an early stage of the aerial refueling boom pose estimation.

Figure 3:
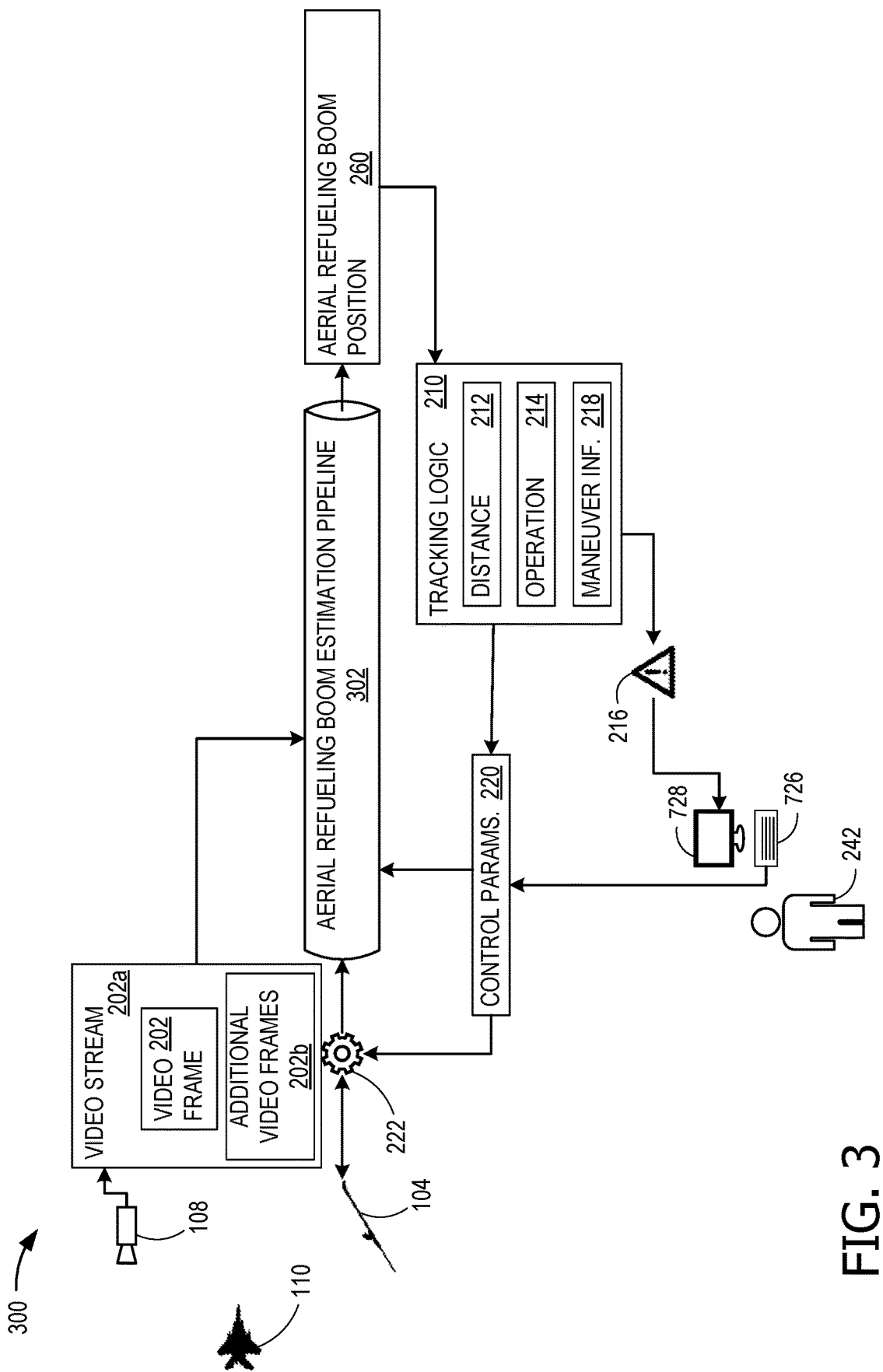
FIG. 3 illustrates a computer vision (CV) architecture that may be used in the arrangement, in accordance with an example.

FIG. 3 illustrates the CV architecture 300 that determines the position and/or pose of an object (e.g., the aerial refueling boom 104) in the arrangement 100. Various components of the CV architecture 300 are shown with further detail in FIG. 4, and the operation of CV architecture 300 is described in further detail in relation to FIG. 6, using flowchart 600. In some examples, the entirety of the CV architecture 300 resides on-board the refueling platform 102. In some examples, portions of the CV architecture 300 operate remotely, off of the refueling platform 102.

The CV architecture 300 receives the video stream 202a of the aerial refueling boom 104 from the camera 108. The video stream 202a includes the video frame 202 and a plurality of additional video frames 202b. Operation of the CV architecture 300 is described in relation to processing the video frame 202. Processing of each of the plurality of additional video frames 202b is similar to that for the video frame 202.

The CV architecture 300 includes an aerial refueling boom position and/or pose estimation pipeline 302. The aerial refueling boom position and/or pose estimation pipeline 302 is shown and described in further detail in relation to FIG. 4. The aerial refueling boom position and/or pose estimation pipeline 302 receives the video stream 202a and outputs the aerial refueling boom position and/or pose 260.

The aerial refueling boom position and/or pose 260 is provided to a tracking logic 210 that determines a distance 212 between the aerial refueling boom 104 and the fuel receptacle 116, which are both shown in FIG. 2. The tracking logic 210 determines boom control parameters 220, which are provided to a boom control 222 that autonomously (or by a human operator) moves the aerial refueling boom 104 to position the boom tip 106 to engage the fuel receptacle 116. That is, boom control 222 controls the aerial refueling boom 104 to engage the fuel receptacle 116. In some examples, the tracking logic 210 also determines whether controlling the aerial refueling boom 104 to engage the fuel receptacle 116 is within operational parameters 214, and if not, generates an alert 216. In some examples, the tracking logic 210 also generates and provides, to the aircraft 110 (e.g., for a pilot or to an unmanned aerial vehicle (UAV)), maneuvering information 218 to facilitate engaging the fuel receptacle 116 with the aerial refueling boom 104 and/or to avoid a non-compliant condition.

Boom control parameters 220 include variables and constraints that describe how the aerial refueling boom 104, and more specifically the moveable parts thereon, may move (e.g., roll, pitch, yaw, translate, telescope, extend, retract, pivot, rotate, and the like). The boom control parameters 220 may control the aerial refueling boom 104 given constraints of the boom pivot position and camera intrinsic and extrinsic parameters (e.g., camera parameters 428, shown in FIG. 4), for example, how to rotate the aerial refueling boom 104 (roll and pitch) and telescopically extend the aerial refueling boom 104.

In some examples, the alert 216 is provided to the human operator 242 over presentation components 728 (e.g., on a video monitor screen). In some examples, the human operator 242 uses input/output (I/O) devices 726 and 728 (e.g., a joystick, mouse, keyboard, touchscreen, keypad, and/or other input devices) to provide the boom control parameters 220 to control the aerial refueling boom 104 to position the boom tip 106 to engage the fuel receptacle 116.

Figure 4:
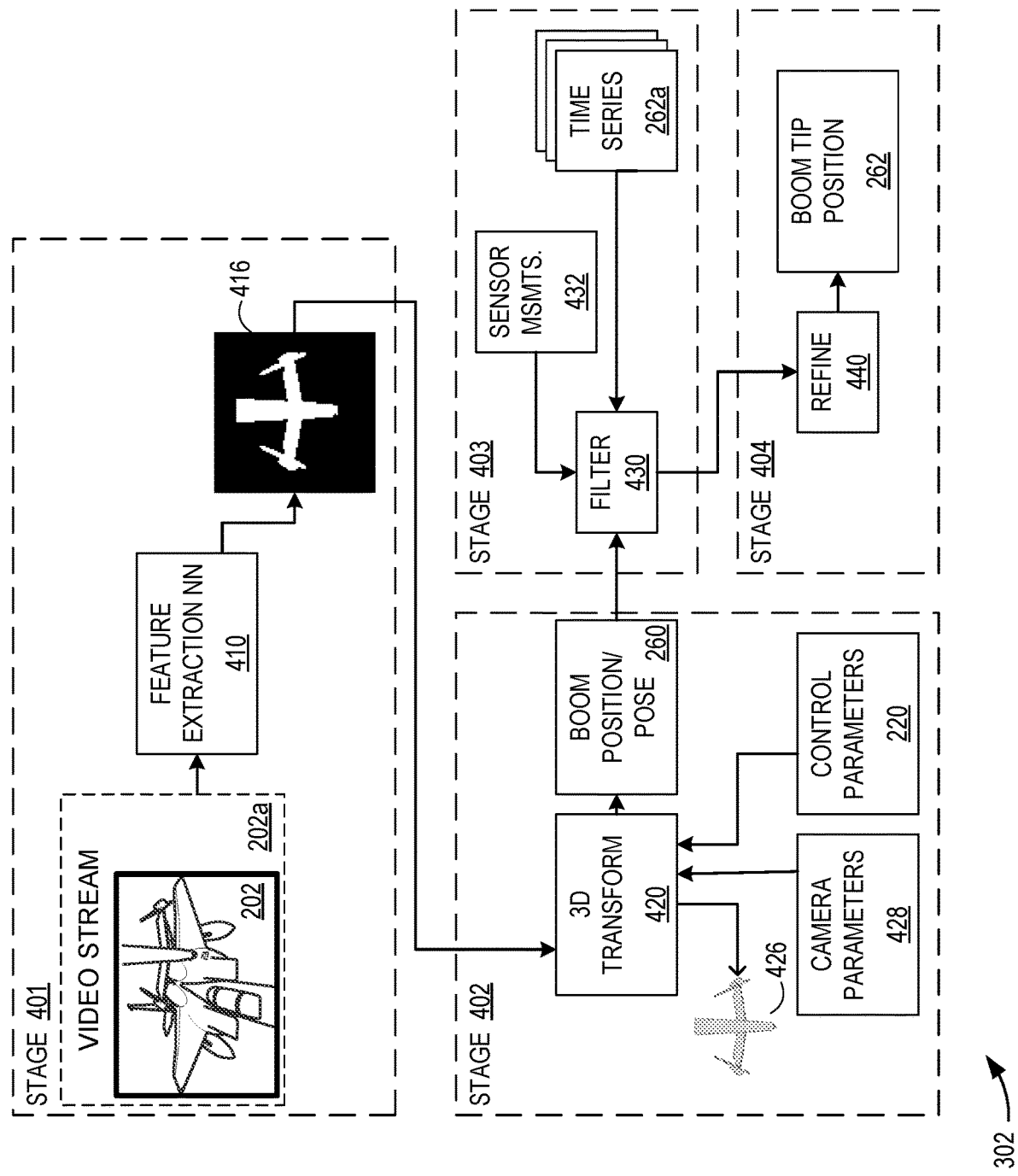
FIG. 4 illustrates a block diagram of an aerial refueling boom pose estimation pipeline in the CV architecture of FIG. 3, in accordance with an example.

FIG. 4 illustrates further detail for the aerial refueling boom position and/or pose estimation pipeline 302 in the CV architecture 300 of FIG. 3. Different classes of operations are possible with the illustrated aerial refueling boom position and/or pose estimation pipeline 302. In one class of operation, a 3D aerial refueling boom model 426 is generated by 3D transform 420. The 3D aerial refueling boom model 426 comprises a CAD model (e.g., a composite mesh) of the aerial refueling boom 104. The CAD model includes known angles, extrinsics, and geometry of the aerial refueling boom 104 in relation to the camera 108 to determine a projection, position, and/or pose of the aerial refueling boom 104. In addition, the 3D aerial refueling boom model 426 includes constraints for moveable parts of the aerial refueling boom 104. Comparing the 3D aerial refueling boom model 426 to a segmentation mask 416 (described below), a position and/or orientation of the aerial refueling boom 104 can be determined at each video stream 202*a*, in relation to the camera 108 at the time of each image (e.g., each video frame) capture. Since the intrinsics of the camera 108 and a position of the camera 108 on the refueling platform 102 are known and a location of the aircraft 110 (and the fuel receptacle 116), the position and/or orientation of the aerial refueling boom 104 with respect to the camera 108 and/or the aircraft 110 may be determined using the methods described herein.

Camera parameter information includes the parameters used in a camera model to describe the mathematical relationship between the 3D coordinates of a point in the scene from which the light comes from and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

In one example, the aerial refueling boom position estimation pipeline 302 comprises four stages: a stage 401, a stage 402, a stage 403, and a stage 404. In the stage 401, the video frame 202 is provided (as part of the video stream 202*a*) to a feature extraction network 410 (e.g., an NN, such as a CNN). Neural networks provide the ability to iteratively optimize their nodes based on an accuracy of a prediction so that as more data/histories are provided, the accuracy of the predictions increases. Further, the performance of neural networks improves as they grow bigger and work with more and more data, unlike other Machine Learning algorithms which can reach a plateau after a point. In some examples, the feature extraction network 410 identifies, within the video frame 202, the aerial refueling boom 104 and generates a segmentation mask 416 matching the aerial refueling boom 104 within the video frame 202. In some examples, instead of using a segmentation mask, keypoints are used. For example, a keypoint heatmap provides a set of aircraft keypoints that are identifiable locations in a two dimensional (2D) image that correspond to features of an object, such as the aerial refueling boom 104 or the aircraft 110, such as wingtips, sharp corners, seams, the abutment of different features (e.g., the canopy with the fuselage).

Figure 5:
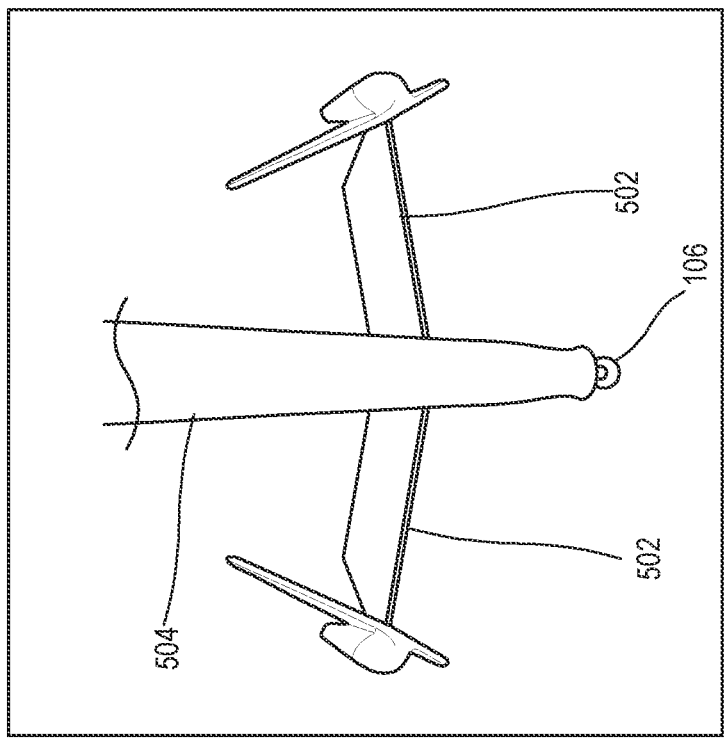
FIG. 5 provides a segmentation mask of an object in the video frame.

With reference now to FIG. 5, a network, such as a CNN, generates the segmentation mask 416 and segments each portion of the segmentation mask 416 that represents a movable part of the aerial refueling boom 104. For example, the segmentation mask 416 includes stabilizers 502 and the boom tip 106, each of which are moveable. In addition, the segmentation mask 416 includes a pole 504, which is rigid (e.g., non-moveable). As such, the stabilizers 502 are segmented from the segmentation mask 416 and the boom tip 106 is segmented separately from other parts of the segmentation mask 416, while the pole 504 is not separately segmented from other parts of the segmentation mask 416. For example, all rigid parts are segmented as a group, while each moveable part is segmented separately from other parts of the segmentation mask 416.

With reference back to FIG. 4, the segmentation mask 416 is provided to the 3D transform 420 in the stage 402. The 3D transform compares the segmentation mask 416 the 3D aerial refueling boom model 426, and based on the comparing, the aerial refueling boom position/pose 260 is determined. That is, when a result of comparing the 3D aerial refueling boom model 426 with the segmentation mask 416 results in a match that is above a minimum threshold level, the estimated position and/or pose of the object (represented by the 3D aerial refueling boom model 426) may be taken as the position and/or pose of the aerial refueling boom 104. In contrast, when the result of comparing the 3D aerial refueling boom model 426 with the segmentation mask 416 results in the match that is below the minimum threshold level, adjustments to the 3D aerial refueling boom model 426 are made using, for example, gradient descent and adjusting the moveable parts of the aerial refueling boom model 426 based on the constraints of the moveable parts until the match is above the minimum threshold. In some examples, the comparing utilizes intersection over union to determine how well/closely the segmentation mask 416 matches the 3D aerial refueling boom model 426. In other example, the dice similarity coefficient is used for the comparing.

The stage 403 uses a filter 430 to performing temporal filtering of the aerial refueling boom position/pose 260. In some examples, the temporal filtering comprises Kalman filtering that performs time-domain filtering across a time-series set of boom positions 262*a*. Thus, in some examples, the filter 430 operates across video frames (e.g., the video frame 202 and the plurality of additional video frames 202*b*).

Once the aerial refueling boom position/pose 260 is known, in the stage 404, a boom tip position 262 (e.g., a position of the boom tip 106), which is in a predetermined location on the aerial refueling boom 104, may be determined using a position refinement algorithm 440 that uses the known position of the boom tip 106 on the aerial refueling boom 104. In some examples, the position of the boom tip 106 is further filtered with a temporal filter (which may be a Kalman filter). In some examples, the filter 430 also fuses proximity sensor measurements 432 of the aerial refueling boom 104, received from the proximity sensor 109. In such examples, determining the position of the boom tip 106 on the aerial refueling boom 104 comprises fusing the proximity sensor measurements 432 of the aerial refueling boom 104 with the aerial refueling boom position position/pose 260. To accomplish this, in some examples, the filter 430 uses a trained network (e.g., an NN) to incorporate the proximity information into the filtering process.

Figure 6:
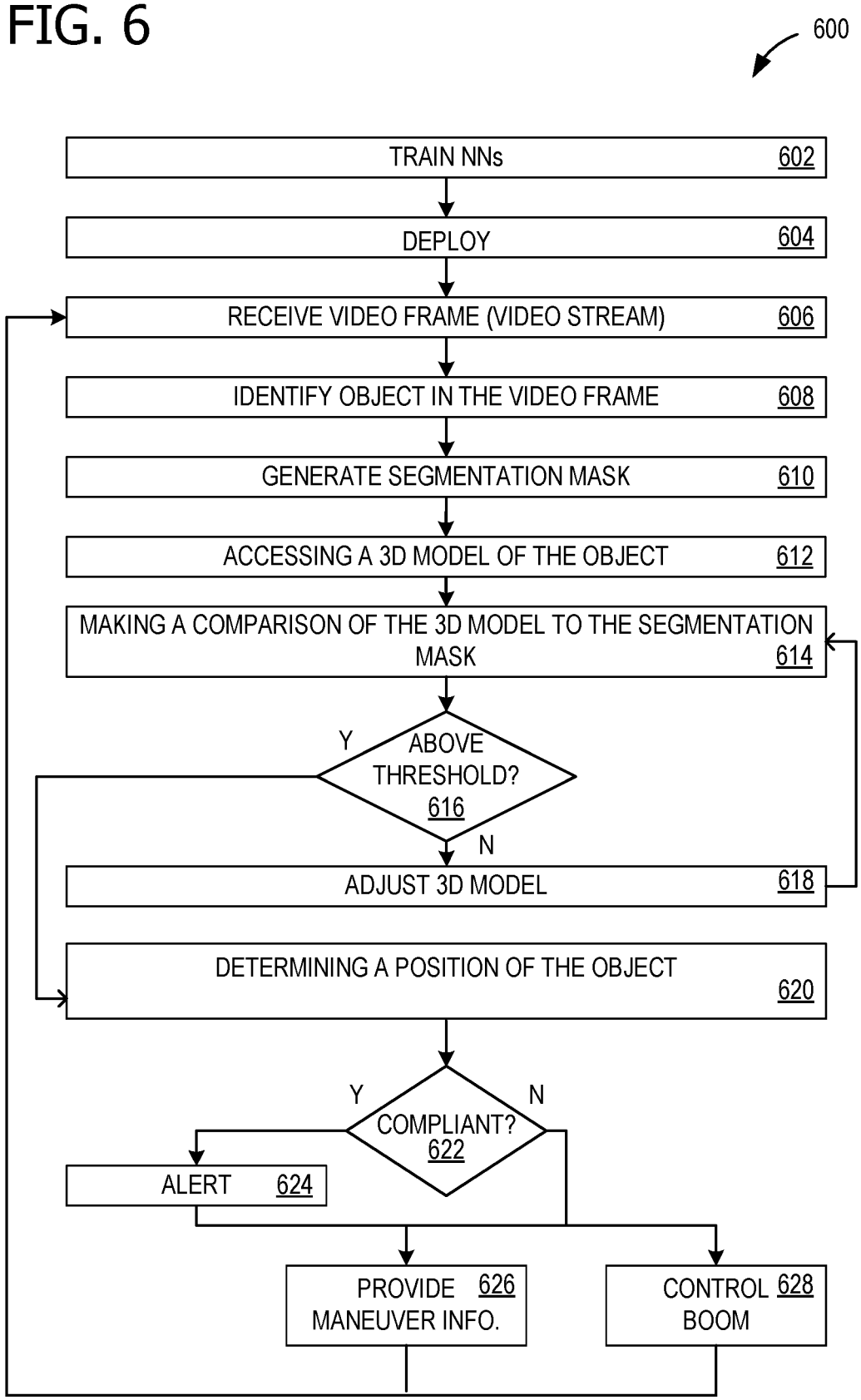
FIG. 6 is a flowchart illustrating a method for determining a pose of an object, as can be used with the arrangement of FIG. 1, in accordance with an example.

With reference now to FIG. 6, a flowchart 600 illustrates a method of air-to-air refueling (e.g., A3R or human-assisted air-to-air refueling) which may be used with the arrangement 100 of FIG. 1. In some examples, the operations illustrated in FIG. 6 are performed, at least in part, by executing instructions (stored in the memory 722) by the one or more processors 719 of the computing device 700 of FIG. 7. For example, any of the feature extraction network 410, the filter 430, the 3D transform 420, and any other ML component of the CV architecture 300 may be trained on a first example of the computing device 700 and then deployed on a second (different) example of the computing device 700.

Operation 602 includes training any networks and/or other ML components of the CV architecture 300. A plethora of different network types may be employed for image segmentation, keypoint extraction, position and pose estimation, filtering, and other operations described herein, including: NNs, FCNNs, CNNs, U-Net CNNs, region-based CNNs (RCNNs), faster RCNNs, mask RCNNs, keypoint RCNNs, and others. In some examples, operation 602 is performed prior to deployment 604, although in some examples, operation 602 remains ongoing during operational use of the CV architecture 300. Operation 606 includes receiving the video frame 202. In some examples, the video frame 202 is provided by a single camera (e.g., the camera 108). In some examples, the video frame 202 is monocular. Some examples include receiving the video stream 202a comprising the video frame 202 and the plurality of additional video frames 202b.

Operation 608 includes identifying, within the video frame 202, an object (e.g., the aerial refueling boom 104) that includes a rigid part and a moveable part. Operation 610 includes segmenting the video frame 202 to generate a segmentation mask 416 matching the object within the video frame 202. Operation 612 includes accessing a three-dimensional (3D) model of the object, the 3D model comprising: a 3D representation of the rigid part, a 3D representation of the moveable part, and constraints corresponding to the moveable part of the object. To accomplish this, some examples of operation 612 include generating the 3D model of the object using a composite mesh. The constraints for the moveable part of the object are stored in a memory (e.g., the memory 722), and in some examples, the constraints are provided by a user, manufacture, or learned from machine learning based on historical data. Operation 614 includes making a comparison of the 3D model of the object to the segmentation mask 416 of the object. Operation 616 includes, based on the comparison, determining whether a match between the 3D model of the object and the segmentation mask of the object is above a threshold. Operation 618 includes, based on determining the match between the 3D model of the object and the segmentation mask of the object is not above the threshold (e.g., is below the threshold), adjusting at least one of the 3D representation of the rigid part and the 3D representation of the moveable part of the 3D model of the object using the constraints. After adjusting the at least one of the 3D representation of the rigid part and the 3D representation of the moveable part, another comparison of the 3D model of the object with the segmentation mask (e.g., the process reverts back to operation 614) is made. In some examples, operations 614, 616, and 618 are reiterated until, at 616, it is determined that the match between the 3D model of the object and the segmentation mask of the object is above the threshold. If it is determined that the match between the 3D model of the object and the segmentation mask of the object is above the threshold, control moves to operation 620. In some examples, the adjusting and the reiteration are based on gradient descent.

Operation 620 includes determining a position and/or pose of the object. The position and/or pose of the object is with respect to the camera 108, the aircraft 110, and/or the fuel receptacle 116. In some examples, operation 620 further includes performing temporal filtering of image-derived data of the object (e.g., the aerial refueling boom 104). In some examples, temporal filtering also, or instead, occurs as part of operation 620. In some examples, performing temporal filtering comprises performing Kalman filtering.

A decision operation 622 determines whether a compliant condition exists upon determining the position and/or pose of the object. Decision operation 622 includes determining whether controlling the object (e.g., the aerial refueling boom 104) to engage the fuel receptacle 116 is out of compliance with the operational parameters 214, using position information of the fuel receptacle 116 and/or the position/pose of the aerial refueling boom 104. If a non-compliant condition exists, operation 624 generates the alert 216. In some examples, a user/operator controlling the aerial refueling boom 104 is provided with the maneuvering information 218, in operation 626, for example to avoid a damaging collision of the aircraft 110 with the aerial refueling boom 104. Operation 626 includes providing, to the user/operator, maneuvering information to facilitate engaging the fuel receptacle 116 with the aerial refueling boom 104. Operation 626 may also occur even under compliant conditions, in some examples. Operation 628 includes, based on at least the position of the fuel receptacle 116 and the position of the aerial refueling boom 104, controlling the aerial refueling boom 104 to engage the fuel receptacle 116. In some examples, controlling the aerial refueling boom 104 to engage the fuel receptacle 116 comprises tracking a distance between the boom tip 106 and the fuel receptacle 116. In some examples, controlling the aerial refueling boom 104 to engage the fuel receptacle 116 comprises determining the boom control parameters 220 to close the distance between the boom tip 106 and the fuel receptacle 116. In situations in which there is a non-compliant condition, operation 628 may instead include controlling the aerial refueling boom 104 to avoid damaging the aircraft 110. The flowchart 600 returns to operation 606 for the next video frame 202 of the video stream 202a. The process continues until the aerial refueling boom 104 engages the fuel receptacle 116 and a refueling of the aircraft completes or when the process is aborted.

Figure 7:
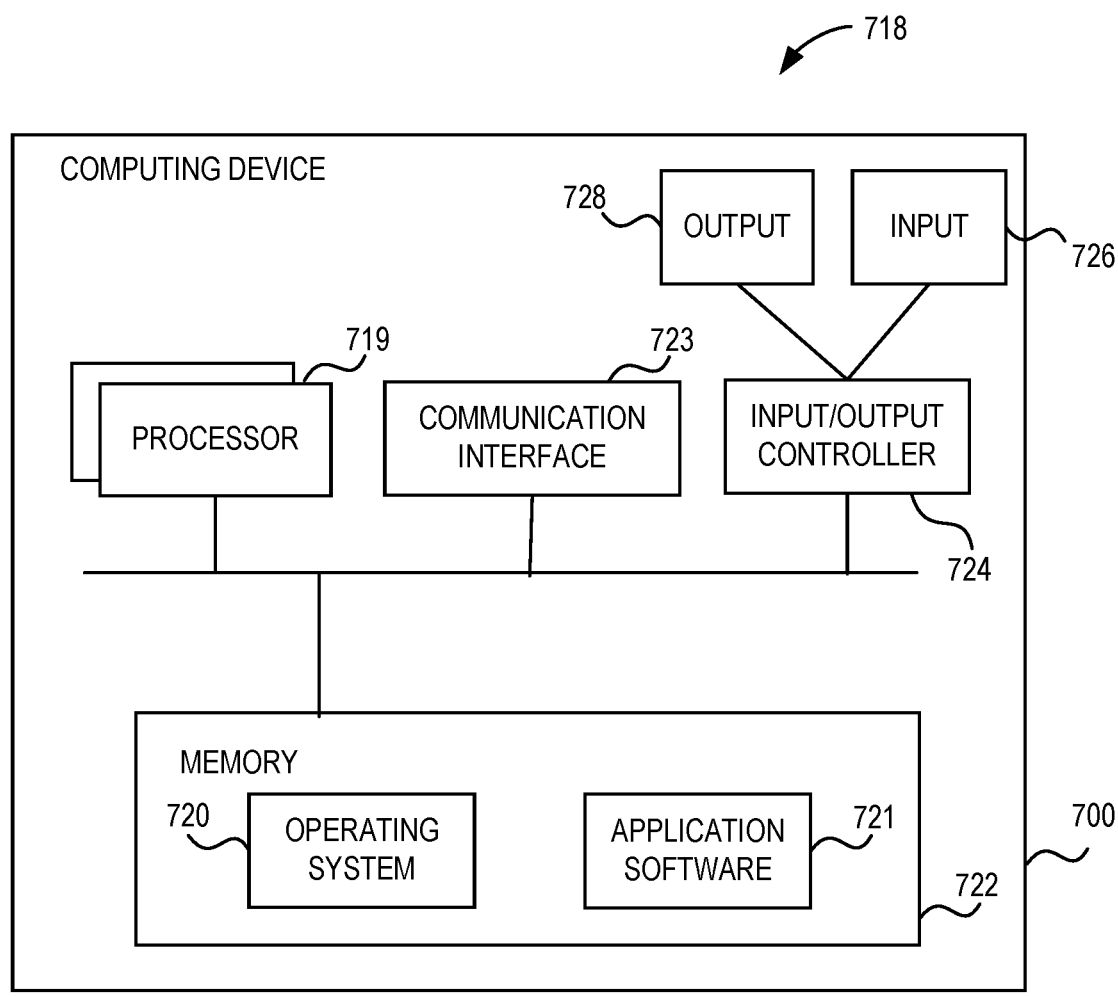
FIG. 7 is a block diagram of a computing device suitable for implementing various aspects of the disclosure in accordance with an example.

The present disclosure is operable with an electronic device (i.e., a computing apparatus, computing device, etc.) according to an implementation as a functional block diagram of the computing device 700 in FIG. 7. In an implementation, components of a computing apparatus 718 are implemented as a part of an electronic device according to one or more implementations described in this specification. The computing apparatus 718 comprises one or more processors 719, for example microprocessors, controllers, and/or any other suitable type of processors for processing computer executable instructions to control the operation of the electronic device. In some implementations, platform software comprising an operating system 720 and/or any other suitable platform software is provided on the computing apparatus 718 to enable application software 721 to be executed on the device.

Computer executable instructions are provided using any computer-readable media that are accessible by the computing apparatus 718. Computer-readable media include, for example and without limitation, computer storage media such as a memory 722 and communications media. Computer storage media, such as a memory 722, include volatile and non-volatile, removable and non-removable, media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that in some implementations the storage is distributed or located remotely and accessed via a network or other communication link (e.g. using a communication interface 723).

In some implementations, the computing apparatus 718 comprises an input/output controller 724 configured to output information to one or more output devices 728, for example a display and/or a speaker, which is separate from or integral to the electronic device. The input/output controller 724 is also configured, in some implementations, to receive and process an input from one or more input devices 726, for example, a keyboard, a microphone, and/or a touchpad. In one implementation, the output device 728 also acts as the input device. An example of such a device is a touch sensitive display. In some implementations, the input/output controller 724 also outputs data to devices other than the output device, e.g. a locally connected printing device. In some implementations, a user provides input to the input device(s) 726 and/or receives output from the output device(s) 728.

In some implementations, the functionality described herein is performed, at least in part, by one or more hardware logic components. According to an implementation, the computing apparatus 718 is configured by the program code when executed by the processor 719 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although described in connection with the computing device 700, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, implementations of the disclosure are implemented with any number and organization of such components or modules. For example, implementations of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, implementations of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible, non-transitory, and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Some examples of the disclosure are used in manufacturing and service applications as shown and described in relation to FIG. 8. In FIG. 8, a diagram illustrating an apparatus manufacturing and service method 800 is depicted in accordance with an example. In one example, during pre-production, the apparatus manufacturing and service method 800 includes specification and design 802 and material procurement 804. During production, component, and subassembly manufacturing 806 and system integration 808 takes place. Thereafter, certification and delivery 810 occur in order to for the apparatus to be placed in service 812. While in service by a customer, routine maintenance and service 814 may include modification, reconfiguration, refurbishment, and other maintenance or service subject to configuration management, described herein.

In one example, each of the processes of the apparatus manufacturing and service method 800 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example system for operating an aerial refueling boom comprises: one or more processors; and a memory storing instructions that, when executed by the one or more processors, cause the one or more processors to perform operations comprising: receiving a video frame; identifying the aerial refueling boom in the video frame, the aerial refueling boom comprising a rigid part and a moveable part; generating a segmentation mask of the aerial refueling boom; accessing a three-dimensional (3D) model of the aerial refueling boom, the 3D model of the aerial refueling boom comprising constraints for the moveable part of the aerial refueling boom; making a first comparison of the 3D model of the aerial refueling boom to the segmentation mask of the aerial refueling boom; based on the first comparison, determining a match between the 3D model of the aerial refueling boom to the segmentation mask of the aerial refueling boom is below a threshold; based on determining the match between the 3D model of the aerial refueling boom to the segmentation mask of the aerial refueling boom is below the threshold, using the constraints to adjust a 3D representation of the moveable part in the 3D model of the aerial refueling boom; upon adjusting the 3D representation of the moveable part in the 3D model of the aerial refueling boom, making a second comparison of the 3D model of the aerial refueling boom to the segmentation mask of the aerial refueling boom; based on the second comparison, determining the match between the 3D model of the aerial refueling boom to the segmentation mask of the aerial refueling boom is above the threshold; and based on determining the match is above the threshold, determining a position of the aerial refueling boom.

An example method of determining a position of an object in a video frame comprises: receiving the video frame; identifying the object from the video frame, the object comprising a rigid part and a moveable part; generating a segmentation mask of the object within the video frame; accessing a three-dimensional (3D) model of the object, the 3D model comprising: a 3D representation of the rigid part, a 3D representation of the moveable part, and constraints corresponding to the moveable part of the object; making a first comparison of the 3D model of the object to the segmentation mask of the object; based on the first comparison, determining a match between the 3D model of the object to the segmentation mask of the object is below a threshold; based on determining the match between the 3D model of the object to the segmentation mask of the object is below the threshold, adjusting at least one of the 3D representation of the rigid part and the 3D representation of the moveable part using the constraints; making a second comparison of the 3D model of the object to the segmentation mask of the object; based on the second comparison, determining the match between the 3D model of the object to the segmentation mask of the object is above the threshold; and based on determining the match is above the threshold, determining the position of the object.

An example computer program product comprises a computer-usable medium having a computer-readable program code embodied therein, the computer-readable program code adapted to be executed to implement a method comprising: receiving a segmentation mask of an aerial refueling boom identified in a video frame, the segmentation mask comprising a segmentation of a moveable part of the aerial refueling boom and a segmentation of a rigid part of the aerial refueling boom; accessing a three-dimensional (3D) model of the aerial refueling boom, the 3D model of the aerial refueling boom comprising constraints for the moveable part of the aerial refueling boom; making a first comparison of the 3D model of the aerial refueling boom to the segmentation mask of the aerial refueling boom; based on the first comparison, determining a match between the 3D model of the aerial refueling boom to the segmentation mask of the aerial refueling boom is below a threshold; based on determining the match between the 3D model of the aerial refueling boom to the segmentation mask of the aerial refueling boom is below the threshold, using the constraints to adjust a 3D representation of the moveable part in the 3D model of the aerial refueling boom; upon adjusting the 3D representation of the moveable part in the 3D model of the aerial refueling boom, making a second comparison of the 3D model of the aerial refueling boom to the segmentation mask of the aerial refueling boom; based on the second comparison, determining the match between the 3D model of the aerial refueling boom to the segmentation mask of the aerial refueling boom is above the threshold; and based on the second comparison, determining a position of the aerial refueling boom.

Alternatively, or in addition to the other examples described herein, examples include any combination of the following:

- the rigid part is a pole of the aerial refueling boom and the moveable part is a stabilizer or an extension of the aerial refueling boom;
- the aerial refueling boom further comprises a second moveable part, and wherein generating the segmentation mask comprises: generating a segmentation of the rigid part; generating a segmentation of the moveable part; and generating a segmentation of the second moveable part;
- the moveable part and the second moveable part have different constraints;
- the position of the aerial refueling boom is relative to an aircraft or a camera on the aircraft providing the video frame;
- prior to making the first comparison of the 3D model of the aerial refueling boom to the segmentation mask of the aerial refueling boom: based at least on an expected position of the aerial refueling boom: adjusting a location of the 3D representation of the rigid part of the 3D model; and using the constraints to adjust the 3D representation of the moveable part;
- identifying an aircraft to be refueled from within the video frame; determining a position of a fuel receptacle on the aircraft; and based on the determined position of the aerial refueling boom: determining whether controlling the aerial refueling boom to engage the fuel receptacle is out of compliance with operational parameters; and based on at least determining that controlling the aerial refueling boom to engage the fuel receptacle is out of compliance with operational parameters, generating an alert;
- a boom control that controls the aerial refueling boom;
- based on the first comparison, determining that the segmentation of the moveable part does not match the 3D representation of the moveable part; and using the constraints to adjust the 3D representation of the moveable part to match the segmentation of the moveable part;
- the adjusting is performed using gradient descent;
- the position of the object is determined prior to receiving a second video frame;
- providing a confidence level based on how closely the 3D model of the object matches the segmentation mask of the object;
- the 3D model is a composite mesh; and
- determining the position of the aerial refueling boom is based at least on determining the match is above the threshold or a threshold number of adjustment iterations has been exceeded.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining a position of an aerial refueling boom from a video frame, the system comprising:
   one or more processors; and
   a memory storing instructions that, when executed by the one or more processors, cause the one or more processors to perform operations comprising:
   receiving the video frame;
   identifying the aerial refueling boom in the video frame, the aerial refueling boom comprising a rigid part and a moveable part;
   generating a segmentation mask of the aerial refueling boom;
   accessing a three-dimensional (3D) model of the aerial refueling boom, the 3D model of the aerial refueling boom comprising constraints for the moveable part of the aerial refueling boom,
      wherein the constraints include information on limitations of how the moveable part may move;
   making a first comparison of the 3D model of the aerial refueling boom to the segmentation mask of the aerial refueling boom;
   based on the first comparison, determining a match between the 3D model of the aerial refueling boom to the segmentation mask of the aerial refueling boom is below a threshold;
   based on determining the match between the 3D model of the aerial refueling boom to the segmentation mask of the aerial refueling boom is below the threshold, using the constraints to adjust a 3D representation of the moveable part in the 3D model of the aerial refueling boom,
      wherein the adjusting is performed using gradient descent;
   upon adjusting the 3D representation of the moveable part in the 3D model of the aerial refueling boom, making a second comparison of the 3D model of the aerial refueling boom to the segmentation mask of the aerial refueling boom;
   based on the second comparison, determining the match between the 3D model of the aerial refueling boom to the segmentation mask of the aerial refueling boom is above the threshold;
   based on determining the match between the 3D model of the aerial refueling boom to the segmentation mask of the aerial refueling boom is above the threshold, determining the position of the aerial refueling boom; and
   controlling, based on determining the position of the aerial refueling boom, the aerial refueling boom to engage a fuel receptacle.

2. The system of claim 1, wherein the rigid part is a pole of the aerial refueling boom and the moveable part is a stabilizer or an extension of the aerial refueling boom.

3. The system of claim 1, wherein the aerial refueling boom further comprises a second moveable part, and wherein generating the segmentation mask comprises:
  generating a segmentation of the rigid part;
  generating a segmentation of the moveable part; and
  generating a segmentation of the second moveable part.

4. The system of claim 3, wherein the moveable part and the second moveable part have different constraints.

5. The system of claim 1, wherein the position of the aerial refueling boom is relative to an aircraft or a camera on the aircraft providing the video frame.

6. The system of claim 1, wherein the instructions further cause the one or more processors to perform the following operations:
  prior to making the first comparison of the 3D model of the aerial refueling boom to the segmentation mask of the aerial refueling boom and based at least on an expected position of the aerial refueling boom:
    adjusting a location of the 3D representation of the rigid part of the 3D model; and
    using the constraints to adjust the 3D representation of the moveable part.

7. The system of claim 1, wherein the instructions further cause the one or more processors to perform the following operations:
  identifying an aircraft to be refueled from within the video frame;
  determining a position of the fuel receptacle on the aircraft; and
  based on the determined position of the aerial refueling boom:
    determining whether controlling the aerial refueling boom to engage the fuel receptacle is out of compliance with operational parameters; and
    based on at least determining that controlling the aerial refueling boom to engage the fuel receptacle is out of compliance with operational parameters, generating an alert.

8. The system of claim 1, further comprising a boom control that controls the aerial refueling boom.

9. A method of determining a position of an object in a video frame, the method comprising:
  receiving the video frame;
  identifying the object from the video frame, the object comprising a rigid part and a moveable part;
  generating a segmentation mask of the object within the video frame;
  accessing a three-dimensional (3D) model of the object, the 3D model comprising: a 3D representation of the rigid part, a 3D representation of the moveable part, and constraints corresponding to the moveable part of the object,
    wherein the constraints include information on limitations of how the moveable part may move;
  making a first comparison of the 3D model of the object to the segmentation mask of the object;
  based on the first comparison, determining a match between the 3D model of the object to the segmentation mask of the object is below a threshold;
  based on determining the match between the 3D model of the object to the segmentation mask of the object is below the threshold, adjusting at least one of the 3D representation of the rigid part and the 3D representation of the moveable part using the constraints,
    wherein the adjusting is performed using gradient descent;
  making a second comparison of the 3D model of the object to the segmentation mask of the object;
  based on the second comparison, determining the match between the 3D model of the object to the segmentation mask of the object is above the threshold;
  based on determining the match between the 3D model of the object to the segmentation mask of the object is above the threshold, determining the position of the object; and
  controlling, based on determining the position of the object, the object to engage a receptacle.

10. The method of claim 9, further comprising:
  prior to making the first comparison of the 3D model of the object to the segmentation mask of the object and based at least on an expected position of the object:
    adjusting a location of the 3D representation of the rigid part of the 3D model;
  and using the constraints to adjust the 3D representation of the moveable part.

11. The method of claim 9, wherein generating the segmentation mask comprises:
  generating a segmentation of the rigid part; and
  generating a segmentation of the moveable part.

12. The method of claim 11, further comprising:
  based on the first comparison, determining that the segmentation of the moveable part does not match the 3D representation of the moveable part; and
  using the constraints to adjust the 3D representation of the moveable part to match the segmentation of the moveable part.

13. The method of claim 9, wherein the position of the object is determined prior to receiving a second video frame.

14. The method of claim 9, further comprising providing a confidence level based on how closely the 3D model of the object matches the segmentation mask of the object.

15. A non-transitory computer readable medium, comprising a computer-readable program code embodied therein, the computer-readable program code adapted to be executed to implement a method comprising:
  receiving a segmentation mask of an aerial refueling boom identified in a video frame, the segmentation mask comprising a segmentation of a moveable part of the aerial refueling boom and a segmentation of a rigid part of the aerial refueling boom;
  accessing a three-dimensional (3D) model of the aerial refueling boom, the 3D model of the aerial refueling boom comprising constraints for the moveable part of the aerial refueling boom,
    wherein the constraints include information on limitations of how the moveable part may move;
  making a first comparison of the 3D model of the aerial refueling boom to the segmentation mask of the aerial refueling boom;
  based on the first comparison, determining a match between the 3D model of the aerial refueling boom to the segmentation mask of the aerial refueling boom is below a threshold;
  based on determining the match between the 3D model of the aerial refueling boom to the segmentation mask of the aerial refueling boom is below the threshold, using the constraints to adjust a 3D representation of the moveable part in the 3D model of the aerial refueling boom,
    wherein the adjustment is performed using gradient descent;
  upon adjusting the 3D representation of the moveable part in the 3D model of the aerial refueling boom, making a second comparison of the 3D model of the aerial refueling boom to the segmentation mask of the aerial refueling boom;

based on the second comparison, determining the match between the 3D model of the aerial refueling boom to the segmentation mask of the aerial refueling boom is above the threshold and based on the second comparison, determining a position of the aerial refueling boom; and controlling, based on determining the position of the aerial refueling boom, the aerial refueling boom to engage a receptacle.

16. The non-transitory computer readable medium of claim 15, wherein the 3D model is a composite mesh.

17. The non-transitory computer readable medium of claim 15, wherein the method further comprises:

providing a confidence level based on how closely the 3D model of the aerial refueling boom matches the segmentation mask of the aerial refueling boom.

18. The non-transitory computer readable medium of claim 15, wherein determining the position of the aerial refueling boom is based at least on determining the match between the 3D model of the aerial refueling boom to the segmentation mask of the aerial refueling boom is above the threshold or a threshold number of adjustment iterations has been exceeded.

19. The non-transitory computer readable medium of claim 15, wherein the method further comprises:

prior to making the first comparison of the 3D model of the aerial refueling boom to the segmentation mask of the aerial refueling boom and based at least on an expected position of the aerial refueling boom:

adjusting a location of the 3D representation of the rigid part of the 3D model; and using the constraints to adjust the 3D representation of the moveable part of the 3D model.

20. The system of claim 1, further comprising a boom control that controls the aerial refueling boom; and wherein the instructions further cause the one or more processors to perform the following operations:

determining boom parameters based on determining the position of the aerial refueling boom; and providing the boom parameters to the boom control to control the aerial refueling boom.

* * * * *